United States Patent [19]

Hino et al.

[11] Patent Number: 5,097,407
[45] Date of Patent: Mar. 17, 1992

[54] ARTIFICIAL INTELLIGENCE PROCESSOR

[75] Inventors: James H. Hino, Corona Del Mar; John M. Walsh, Chino, both of Calif.

[73] Assignee: Integrated Inference Machines, Anaheim, Calif.

[21] Appl. No.: 302,150

[22] Filed: Jan. 25, 1989

Related U.S. Application Data

[63] Continuation of Ser. No. 894,907, Aug. 8, 1986, abandoned.

[51] Int. Cl.[5] .................................................. G06F 9/16
[52] U.S. Cl. .................................... 395/375; 364/262.7; 364/262.8; 364/DIG. 1; 395/500; 395/800
[58] Field of Search ... 364/200 MS File, 900 MS File, 364/262.7, 262.8, 280, 280.4

[56] References Cited

U.S. PATENT DOCUMENTS

| | | | |
|---|---|---|---|
| 3,725,868 | 4/1973 | Malmer, Jr. et al. | 364/200 |
| 3,766,532 | 10/1973 | Liebol, Jr. | 364/200 |
| 4,126,896 | 11/1978 | Yamazaki | 364/200 |
| 4,156,279 | 5/1979 | Wilhite | 364/200 |
| 4,586,127 | 4/1986 | Horvath | 364/200 |
| 4,922,414 | 5/1990 | Holloway et al. | 364/200 |

Primary Examiner—Salvatore Cangialosi
Attorney, Agent, or Firm—Harold L. Jackson

[57] ABSTRACT

A high-speed processor capable of processing any user-selected one of several symbolic languages is disclosed. The processor includes a programmable instruction decoder and a store for a ram-variable instruction set. Fixed bit length tags precede and identify the type of data associated with each tag. Large groups of bits in one or more tags are decoded simultaneously to access a programmable microsequencer and a microprogram memory.

6 Claims, 2 Drawing Sheets

ARTIFICIAL INTELLIGENCE PROCESSOR

FIELD OF THE INVENTION

This invention, which is a continuation of 06/894,907 filed Aug. 8, 1986, now abandoned, relates generally to computer architecture and more specifically to a computer processor having efficient symbolic processing and self test capability.

DEFINITIONS

In order to more fully understand the invention and its background some commonly used terms are defined at this point.

CACHE—A buffer between main memory and the processor to decrease the latency of waiting for a new data word from main memory.

COMPILER—A program that translates text into machine instructions (macroinstructions).

CYCLE—The transition of the processor clock from a logic "true" to "false" and back to "true" again.

DECODE—A translation from one representation to another to be compatible with the device connected to the output of the decoder.

FIELD DEFINITION—The meaning of fixed groups of bits in an instruction.

HARD-WIRED—Fixed interconnection between logic elements.

INSTRUCTION SET—A group of binary codes that the processor interprets as a sequence of operations.

MACROINSTRUCTION—An instruction from main memory that defines a group of microinstructions that are to be performed.

MICROCODE—Instructions to the processor, each of which are executed by the processor in one cycle of the processor clock.

MICROINSTRUCTION—A group of control bits stored and fetched from microgrogram memory that control the processor in one clock cycle.

MICROPROGRAM—See microcode.

PIPELINE—A series of one or more memory devices that delay the signals that flow through memory devices by one clock cycle.

SYMBOLIC PROCESSING—A type of processing commonly use in artificial intelligence applications where data is manipulated by name independent of type.

BACKGROUND OF THE INVENTION

Processors having symbolic processing and self-testing capability for a given language are known. This invention is programmable to accept and process any one of the known languages. This flexibility is provided by an instruction decoder with variable instruction set and variable field definition.

Features of symbolic processing include:

1. Bit-wise tag decoding. Essentially the tag contents are determined by sequentially testing one bit of the tag at a time in bit-wise decoding. Improved operation is achieved in this invention by testing large groups of bits at a time.

2. Small tag size. It is generally known to keep the number of bits used to formulate a tag's contents as a small number, say four bits/tag. Improved operation is achieved in this invention by using a higher number of bits/tag.

3. Small microcode stack. Typically a stack memory is limited to a depth of about four to eight words. A microcode sequence includes microinstructions, the solution of which takes several steps. The steps taken require a return to the previous set of microinstructions. The prior art stored information regarding the return in main memory since the number of returns stored may be large. This invention, in comparison, comprises a vast internal memory stack for storing information regarding the return. This return-storage feature reduces the number of memory accesses and thus provides enhanced processor speed.

4. Fixed instruction set. Most processing is accomplished through a hard-wired decoding of a predetermined instruction set. For example, an operation of any given macroinstruction was determined by a given field in an instruction. Thus, for example, a fixed field would define whether an operand was in a memory or a register A hard-wired retrieval was executed to the appropriate memory or register element. This invention demonstrates improved flexibility by employing a variable instruction set.

5. Quantity of registers. A small number of registers from zero to about thirty-two is used in the prior art. Conventional processors use data caching to decrease net memory access time. This invention employs a large number of registers which it uses as a data cache, and therefor involves less memory access time with improved processing speed. In addition, a means of quickly accessing sequential registers is incorporated.

6. Stack manipulation. Typical processors of the prior art were limited to a single stack or hold stack pointers in a standard register. This invention includes five special purpose pointers to handle stacks. Each pointer can be incremented, decremented or loaded independent of other processing. In addition, each pointer can be compared to its limit while it is used to access memory.

7. Control memory. Most control memories do not have the capability of being self tested. Typically the control memory may include 64K by 64-bit words each of which requires a bit by bit verification. It is common in such prior art to use a macro level test. For example to test all of the microcontrol words in a macro level function such as "Add" requires a bit by bit testing of numerous words each 64-bits long. Testing all of the various binary combinations take an exceeding long time. Moreover exhaustive testing is almost impossible to accomplish, since one must test, not only the expected, but the unexpected as well. Such testing of the prior art is costly, inefficient and slow.

SUMMARY OF THE INVENTION

This invention features a programmable processor capable of being programmed for and executing any one of the known artificial intelligence languages.

The processor of this invention includes a programmable instruction decoder having a variable instruction set which is preselected by a user. A variable instruction set of this invention is determined by a look up table in a random access memory. Using the ram-variable instruction set allows the processor of the invention to be configured with an instruction set that is compatible with a wide range of known languages, such as Prolog, Lisp, etc. An exceedingly fast processing time is provided for any of said languages by the features of this invention taken singularly or in combination. Some of the more salient features are now individually described.

In this invention each processor word is of a fixed size such as forty bits. For example such a word is composed of 32 bits of data, and it is always preceeded by a fixed-bit-length tag which defines the contents of the data word it precedes. The tag, for example, may be eight bits long. The processor of this invention decodes large groups of bits from one or more tags simultaneously. The tag decoder of this invention enhances the speed and efficiency of the invented system.

Rather than employ a small microcode stack, the depth of the stack in this invention is in the order of sixteen thousand locations. The large number of locations allows recursive microcoding. In recursive coding, many calls are made to the same code before returning from the code. Therefore information regarding what should be done when each call to the code completes, must be stored in a piece of hardware such as a stack. Efficient processing of complex data structures is provided by this large capacity microcode stack.

This invention employs a large number of internal registers for use as a data cache. Increased speed results from a decreased number of memory access operations, and the fact that the invention does not have to determine whether the data is in the data cache or in main memory at run time further increases speed. A compiler for this invention allocates registers so that no processing time overhead is incurred when running the compiled program. This invention uses counters to access the registers that can be incremented, decremented or loaded. The counters can be loaded from data or instructions. These features allow groups of registers to be moved quickly.

This invention has facilities for handling concurrently up to five stacks. Each stack can have a value pushed or popped and automatically limit checked when used. Additionally however a selected portion of each stack can be allocated or deallocated.

A writable control store is employed together with means for reading the contents so that they can be compared with that which was loaded into the writable control store. Verification by self test is provided simply by checking what is actually loaded into the control store against what was intended to be loaded.

DETAILED DESCRIPTION OF THE DRAWINGS

Figure 1:
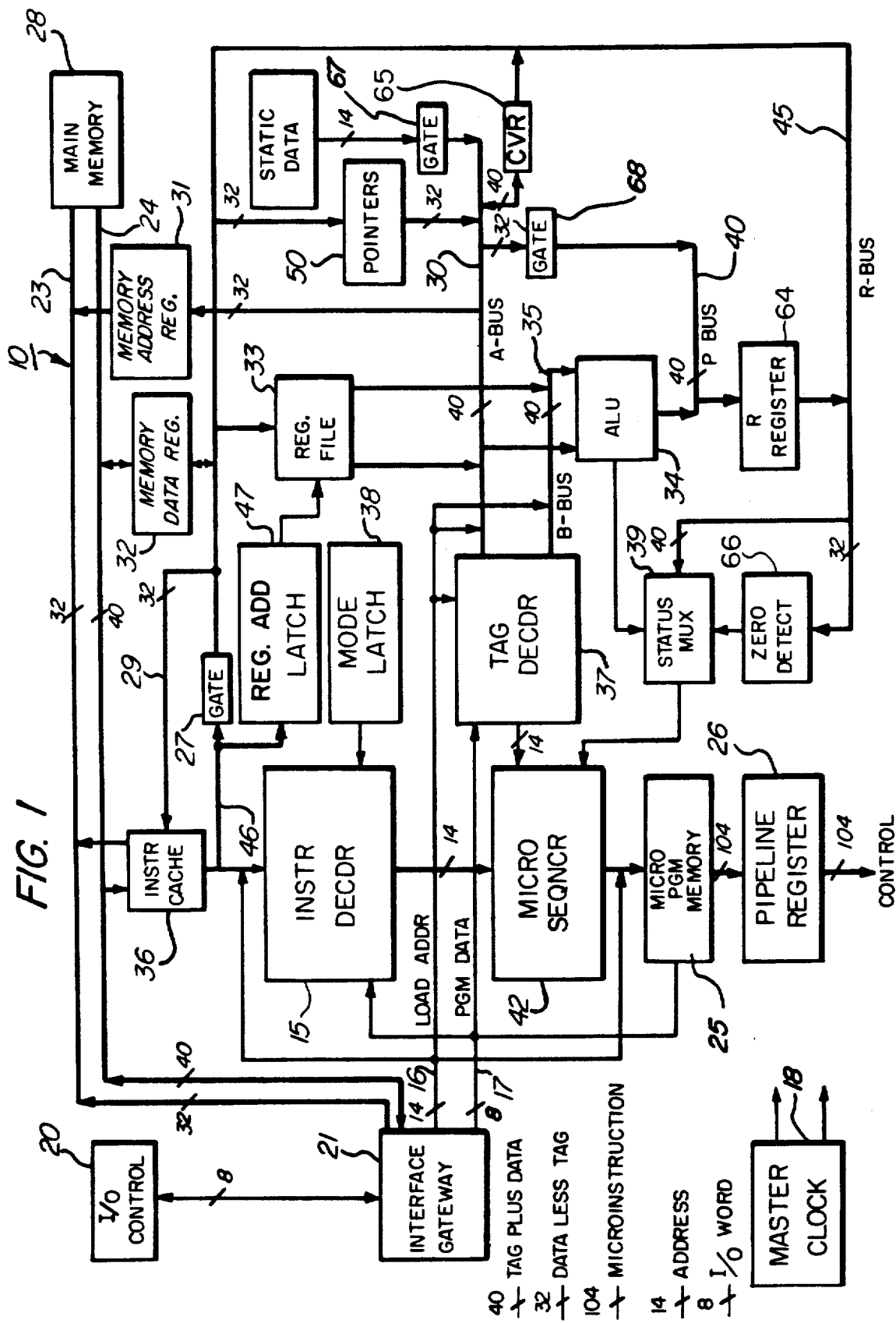
FIG. 1 is a block diagram of the processor of this invention suitable for tag or instruction decoding.

FIG. 1 depicts a microprogrammable processor 10 in accordance with this invention. The processor 10 interfaces with a user and peripheral devices through an I/O gateway 21 and via an I/O controller 20. Although diverse in the functions to be performed, processor 10 is particularly adapted for processing any user-selected one of several artificial intelligence or symbolic languages. While shown singularly in FIG. 1, several identical processors 10 may be concurrently processing in parallel.

Prior to describing the unique features of the processor 10 in a typical operational procedure, it is necessary to describe an initialization sequence. As is commonly known, such initialization requires that hardware and software be loaded.

I/O controller 20, via gateway 21, loads instruction decoder memory 15 with 14-bit-wide data. Since I/O controller 20 feeds 8-bit-wide data into gateway 21, two 8-bit-wide words are combined for a single 16-bit-wide output from gateway 21 on lead 16. Two bits of the 16-bit-wide words are unused, leaving 14-bit-wide words loaded into instruction decoder 15. Throughout the figures the number of bits communicating in the processor are shown by the number adjacent to the solid line diagonally intersecting the electrical connection in question. Note that two input lines go into memory 15 from I/O gateway 21. One line, line 16, is for 14-bit-wide addresses. The other line, line 17, is for 8-bit-wide data. Address 0 on lead 16 stores the first 14-bit-wide word at address location 0. This process is repeated approximately 16,000 times for 16,000 separate addresses in order to fully load instruction decode memory 15.

An identical process is employed for loading tag decoder 37 via data line 17 and address line 16. The two decoder memories 15 and 37 are employed to selectively access a microprogram memory 25 as will be fully described hereinafter.

A similar loading process is employed to load microprogram memory 25. This memory has 104-bit-wide storage locations. Accordingly thirteen 8-bit-wide words are used for each address 0, 1, 2 etc. Note that both leads 16 and 17 also go to microprogram memory 25. Once loaded a self check of the contents is compared against the input contents by any well known comparison process or machine. Relevant testing procedures are commonly known, and thus no further description of this feature of the invention is required.

Processor 10 is now loaded with a given language and after a master reset command (not shown) is removed by I/O controller 20, processor 10 commences operation. Operation is under control of a master clock 18, which for clarity in the drawing is not shown connected to the various operational units. Clock signals are applied to the elements of processor 10. The first clock pulse after a master reset command is removed, causes microsequencer 42 to provide an address via lead 43 into microprogram memory 25. The contents of memory 25 are microinstructions. Stored at each address location in memory 25 is one 104-bit-wide word which word is output into a pipe line register 26 as a microinstruction. The output from register 26 is the overall control for operation of processor 10. Each 104-bit-wide control word is latched for a duration of one clock cycle into register 26. Bit locations within the output word from register 26 control all the functional units shown in FIG. 1. A typical list of the assignment of control bits within a microcontrol word is supplied at Appendix A. The operation of register 26 is also described in more detail hereinafter. Suffice it here to say that individual bit positions in the output from register 26 during every cycle control various functional units as specified, in order to accomplish a unique function as defined for that bit location.

The first set of instructions after initialization that are issued from pipeline register 26, controls the interface processor gateway 21 to allow I/O control 20 to load a program and data into main memory 28. Main memory 28 is a storage location for macroinstructions. A program appropriate for the preselected language is thus loaded into main memory 28 at this time. Such a program includes addresses and data. Two busses 23 and 24 are connected between gateway 21 and main memory 28. Bus 23 is the address bus and bus 24 is the data bus. Note that 32-bit-wide addresses are required for the main memory. The main memory is organized with 40-bit-wide words.

Macroinstructions are read from main memory 28 into an instruction cache 36. Both data and addresses are exchanged between cache 36 and main memory 28 in order to process macroinstructions. Concurrently with such exchanges, cache 36, as required, issues main memory instructions as addresses to the instruction decoder 15. Connected to instruction cache 36 is register address latch 47, which latch receives an instruction from cache 36 and implements that instruction by selecting any one of a multiple of registers that make up register file 33.

When macrolevel branches are being processed it is often necessary to modify the location within cache 36 wherein an instruction is to be fetched. This requirement is met by lead 29 which feeds into cache 36 a value that is read from the R-bus 45.

Four main busses are employed. These four busses are designated as the A-bus 30, B-bus 35, P-bus 40 and R-bus 45. The A-bus is sourced by the register file 33, static data through gate 67, the R-bus 45 via transceiver 65 or the pointers 50. The A-bus drives the tag decoder 37, arithmetic line unit 34, memory address register 31 or R-bus 45 via transceiver 65. The B-bus is sourced by the register file 33 and drives the tag decoder 37 and the arithmetic line unit 34. The R-bus 45 is a general purpose bus that can be sourced by the arithmetic line unit result latch 64, the A-bus via transceiver 65, the data from the instruction cache via gate 27 or the memory data register 32. The R-bus drives the zero detector 66, the A-bus 30 via transceiver 65, the memory write data register 32, the instruction cache address 36 or the register file 33. The P-bus is sourced by the arithmetic line unit 34 and the A-bus 30 via gate 68. The P-bus drives the result register 64.

The register file 33 comprises a plurality of ultra high speed RAMS. These RAMS are time division multiplexed so that they may be read from and written to in the same clock cycle. The RAMS receive data from the R-bus and drive data to the A-bus and the B-bus. The pointers 50 are constructed from five sets of thirty-two bit counters. Each counter can be individually loaded, incremented or decremented. The pointer 50 receives load input from the R-bus and drives its output on the A-bus.

Although A-bus 30 and B-bus 35 serve several functions, one of their primary functions is to hold temporary tag and data. Arithmetic unit 34 manipulates the held data as required for a given microinstruction. The arithmetic line unit is comprised of two main elements, the math/logic unit and the shift unit. Both the math-/logic unit and the shift unit are capable of 8, 16 or 32 bit operation as specified by the data type. The result of the manipulation is placed on P-bus 40. The tags that appear on the A and B busses 30, 35 are decoded as an address as described hereinafter.

The A and B busses each feed tags into a tag decoder 37. Associated with tag decoder 37 is a mode latch 38. The tag decoder 37 is implemented as a RAM. This tag decoder 37 has two operating modes as set by the mode select latch 38. The modes of operation for tag decoder 37 is to decode the tags that appear on A-bus 30 only or to decode the tags that appear on the A-bus 30 in combination with the tags on the B-bus 35.

Mode latch 38 is set by pipeline register 26 to select the mode of operation for instruction decoder 15. Mode latch 38 is settable to any one of several possible states, each of which controls the condition of instruction decoder 15. For example, different languages require that macrolevel instructions be performed differently based upon the state of processor 10. In a preferred and simplified embodiment of this invention, a description of two different states will suffice. The original state of mode latch 38 is set prior to the time when macroinstructions are executed. The result of a macroinstruction can change the state of mode latch 38 as required during operation of processor 10.

Mode latch 38 is also capable or being commanded to assume one of a predetermined number of possible tag decode combinations. For example, mode latch 38 can be set in one out of possible combinations depending upon the execution of the macro and microinstructions then being performed by processor 10. Mode latch 38 supplies tag decode control signals to tag decoder 37. The tag decoder output, applied to the microsequencer 42, is a 14-bit address.

Figure 2:
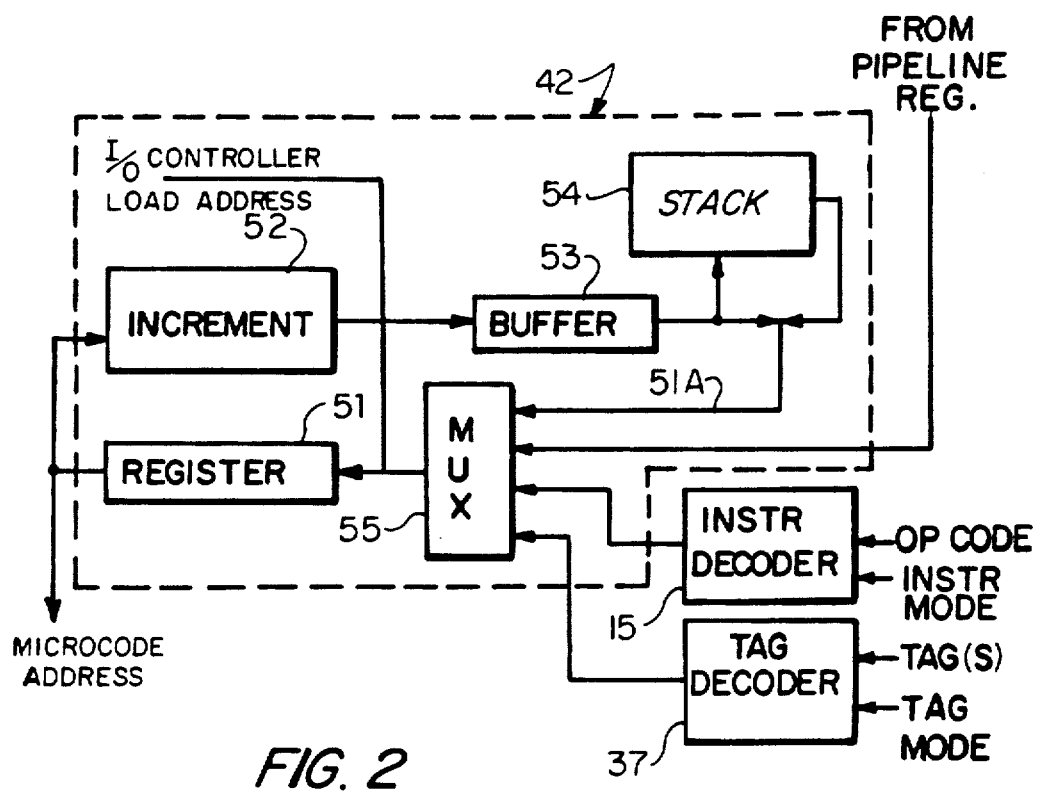
FIG. 2 is a microsequencer block diagram.

FIG. 2 depicts the microsequencer 42 in more detail. As shown in FIG. 2, the microsequencer 42 is implemented by a register 51, an incrementer 52, a buffer 53, a stack 54 and a multiplexer 55. The stack 54 may be of any suitable last-in-first-out ("LIFO") type. The output of the multiplexer 55 which is applied to register 51, is the current microprogram address. One input, 51A, to multiplexer 55 is the output of buffer 53 as modified by the LIFO 54.

Figure 3:
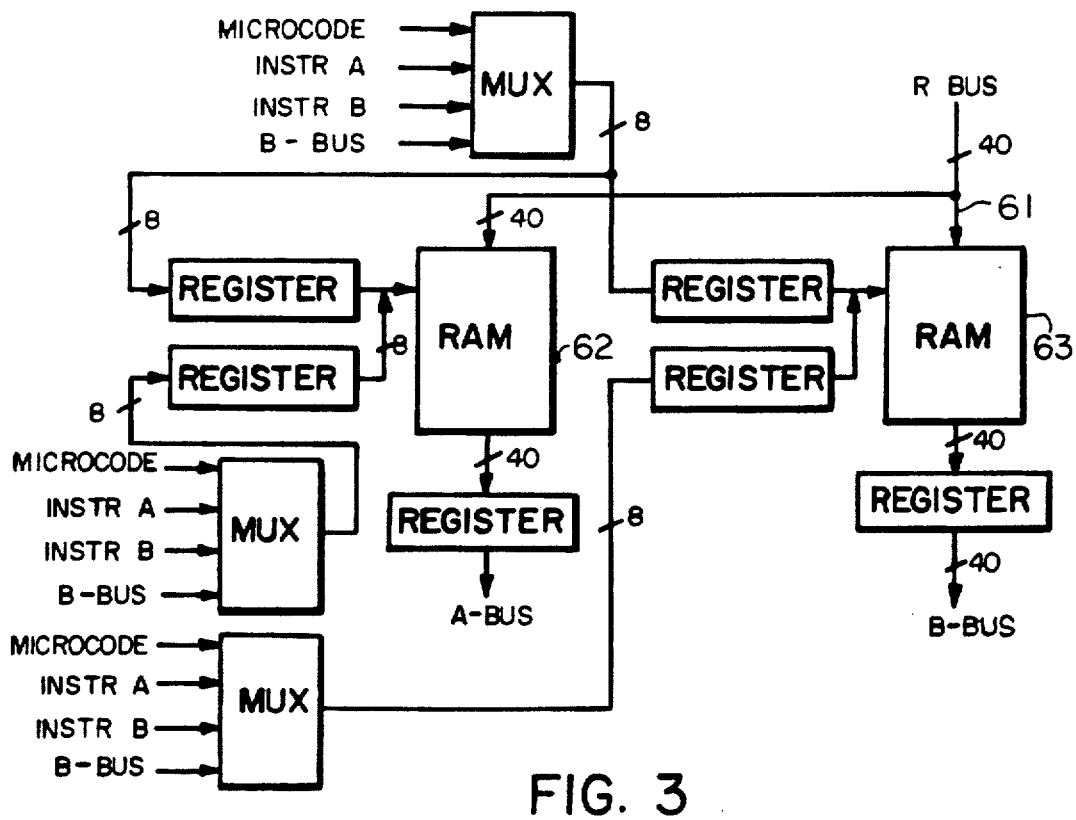
FIG. 3 is a block diagram of a register file of this invention.

FIG. 3 depicts that the register file 33 has one input 61 which is applied to two RAMS 62, 63. Each RAM receives and stores the identical data. Each RAM for example, may have 256 memory locations that are each 40-bit-wide. In this manner independent outputs (76 and 77) are available for A-bus 30 and B-bus 35. With identical RAMS and an input and output register configuration as shown, each cycle is broken into two parts. An input term is exposed to the RAMS at the beginning of a cycle and the output is latched in the output register. An address for the desired input is exposed to the RAMS during the second half of the cycle and the desired value on the input is written into both RAMS at the end of the cycle. The input terms for selecting the input and output registers are from pipeline register 26 or from the instruction decoder 15.

DESCRIPTION OF A TYPICAL OPERATION

It is believed easier to explain the operation of the interplay of the functional units of processor 10 by describing a typical operation. The typical operation refers to the elements shown in the drawing and should be read in light of the applicable information in Appendix A, B and the microcode example supplied herewith.

Assume that the macroinstruction from main memory, 28 is: A "branch" if register number "5" is greater than the top of stack number "1". Thereafter the branch microinstructions from register 26 control the functional units of processor 10 so that this assumed macroinstruction is carried out. A sequence of ordered microinstructions follow with each step requiring a cycle of the master-clock from clock source 18. Such order includes steps 1 and 2 which are used to fetch and decode the branch macroinstruction. This macroinstruction is composed of two 40-bit-wide words the first of which is the instruction itself together with the register select, and the second of which is the address to jump to if the branch condition is correct.

Steps 3, 4 and 5 are used to fetch the top of stack 1. Steps 6, 7 and 8 show how a compare is performed by subtraction and a conditional microcode branch is performed. Finally, steps 9 and 10 show how a macroinstruction branch is performed.

An explanation of each ordered step follows:

Step 1. The branch macroinstruction is loaded from main memory 28 into the instruction cache 36. In order to obtain the macroinstruction, cache 36 addresses main memory via bus 23, and the instruction is returned from memory 28 to cache 36 over bus 24.

Step 2. The received branch instruction is output from cache 36 to instruction decoder 15, and is also latched into instruction latch 47 via lead 46 (this information includes the register number in this case "5", used in step 5.). At this cycle the instruction decoder 15 translates the branch instruction into a microsequencer address. In this operation, register 26 controls microsequencer 42 to accept that address, which acceptance in turn jumps to a new location in the microprogram memory 25. Stored at this new location is the first microinstruction of the branch macroinstruction which is Step 3.

Step 3. The pointer associated with stack number 1 in pointer 50 is output on A-bus 30 and loaded into memory address register 31. Register 31 applies the address onto memory address bus 23.

Step 4. Main memory 28 responds to the address supplied by register 31 by, in return, supplying data over memory data bus 24. That data is loaded into memory data register 32.

Step 5. Register 32 loads that data into a temporary register in register file 33.

Step 6. Register number 5 is accessed by the instruction stored in register address latch 47. This register number 5 is part of the branch macroinstruction as stated in Step 2. The contents of register number 5 is then output onto A-bus 30. Concurrently the contents that went into the temporary register in register file 33 is output onto B-bus 35. Mode latch 38 at this point receives data from the control output from pipeline register 26. The output of mode latch 38 and the tags on the A and B-bus are transformed by tag decoder 37 into a microsequencer address which is applied to microsequencer 42. At this point register 26 controls microsequencer 42 to accept the address from tag decoder 37, which acceptance in turn jumps to a new location in the microprogram stored in memory 25. Since the two tags from the A and B busses were involved in determining the new address, the microinstruction is a function of those two tags. Among the many possible tag combinations are two 32-bit integers, and such a combination creates a specific address in microprogram memory 25. Let us assume that both tags indicate 32 bit integers and that the specific address takes us to Step 7.

Step 7. An arithmetic operation is performed by logic unit 34 based upon the contents of register number 5 and the temporary register appearing on busses A and B respectively. Unit 34 performs a 32-bit integer subtract.

Step 8. The result of the subtraction in unit 34 is applied to a status multiplexer 39. That result flows through into the microsequencer 42 and its state determines whether there is a microinstruction jump or not. Let us assume that in this case no jump is required because register 5 was greater than the top of stack 1 as indicated by the output from status multiplexer 39. This result indicates that a macrolevel branch is required which in turn causes a jump to a new memory location in main memory location 28 which is described in Step 9.

Step 9. Pipeline register turns on instruction-to-R-bus gate 27 which applies the macroinstruction address to the R-bus 45. Lead 29 transfers the address from the R-bus 45 into the address portion of instruction cache 36 and the macroinstruction is complete.

Step 10. The next macroinstruction from instruction cache 36 is now decoded and the operation continues.

MICROCODE FOR THE FOREGOING TYPICAL EXAMPLE

The following steps show the signals that are active for the instruction example. The signals not shown are assumed to be in their inactive state. The signal names are that stated in Appendix A.

STEP 1: None, this step is performed automatically by the hardware.

STEP 2: NAMUXSEL=JUMP-ON-INSTRUCTION, INSFTCH=TRUE, LREGSEL=TRUE

STEP 3: ABUS=POINTER1, MAREN=TRUE

STEP 4: MDRREN=TRUE

STEP 5: RBUS=MEMORY-DATA-REGISTER, DMUXSEL=MICROCODE, DREG=TEMPORARY, REGWE=TRUE

STEP 6: AMUXSEL=INSTRUCTION-LATCH, ABUS=REGISTER-FILE, ATAGOE=TRUE, BREG=TEMPORARY, BMUXSEL=MICROCODE, BREGOE=TRUE, TAGMODE=DUAL-TAG-FOR-INSTR, TAGMEN=TRUE, NAMUXSEL=JUMP-ON-TAG

STEP 7: AMUXSEL=INSTRUCTION-LATCH, ABUS=REGISTER-FILE, ATAGOE=TRUE, BREG=TEMPORARY, BMUXSEL=MICROCODE, BREGOE=TRUE, PROCSEL=MINUS, MODE32=TRUE, ALUOE=TRUE, SETC=TRUE, ENASTAT=TRUE

STEP 8: STSEL=CARRY, NAMUXSEL=JUMP-ON-MICROCODE-JMPADR, JMPADR=NO-BRANCH-MICROCODE

STEP 9: RBUS=CACHE, CLRCH=TRUE, NAMUXSEL=JUMP-ON-INSTRUCTION, INSFTCH=TRUE, LREGSEL=TRUE

APPENDIX A: MICROCONTROL WORD DEFINITION

The following is the definition and description of each of the bits within the microcontrol word. The number in parenthesis is the functional unit number of FIG. 1.

| BIT NUMBER | NAME | DESCRIPTION |
| --- | --- | --- |
| 0 | INTREN | Interrupt mask and self test enable (42) |
| 1 | MIDLE | Allow other devices access to memory (42) |
| 2 | WAITMEM | Hold at the next instr until memory done (42) |
| 3 | RADREN | Enable microsequencer return address (42) |
| 4 | RADRPOP | Direction of return address stack (42) |
| 5 | MDRWEN | Load MDR with R-bus value (32) |
| 6 | LREGSEL | Latch the register select |

-continued

| BIT NUMBER | NAME | DESCRIPTION |
|---|---|---|
| | | & lower 16 bits of cache (47) |
| 7 | MDRREN | Enable reading of memory (32) |
| 8 | INSFTCH | Advance instruction cache by one instruction (36) |
| 9 | CLRCH | Clear instruction cache and load address from R-bus (36) |
| 10 | CLRCHE | Clear instruction cache error (42) |
| 11 | CLRBUSE | Clear memory bus error (42) |
| 12 | OSTEN | Latch lower 8 bits of R-bus into output status latch |
| 13-15 | RBUS | Selection of output to the R-bus (32,40,27) |
| 16-29 | JMPADR | Microcode branch address (42) |
| 16-29 | CONSTANT | Constant for output to A-bus or operation on tag (14) |
| 16-23 | TAGMODE | Tag decode mode (if MSB=1 then merged mode) (38) |
| 24 | INSMODE | Instruction decode mode (38) |
| 30 | INSMEN | Latch instruction mode (38) |
| 31 | TAGMEN | Latch tag mode (38) |
| 32-37 | STSEL | Status select (see Appendix B) (39) |
| 38 | CONDID | Enable conditional instruction fetch (36) |
| 39 | STINV | Status invert control (39) |
| 40-41 | AREGSEL | A register source select (microcode, B-bus or instr) (33) |
| 42-46 | AREG | Microcode selected A register (33) |
| 47-48 | BREGSEL | B register source select (see AREGSEL for options) (33) |
| 49-53 | BREG | Microcode selected B register (33) |
| 54-55 | ARSEL | A-bus/R-bus bypass select (40) |
| 56-60 | DREG | Microcode selected destination register (33) |
| 61 | BIRSCEN | B instruction register select clock enable (47) |
| 62-63 | NAMUXSEL | Next address select (next instr, ucode, instr or tag) (42) |
| 64 | REGWE | Register write enable (33) |
| 65 | POINTLD | Load pointers with clocks enabled (50,47) |
| 66 | POINTDN | Decrement pointers with clocks enabled (else incr)(50,47) |
| 67-71 | PCLKEN0-4 | Pointer clock enables (50) |
| 72 | ATORDIR | Direction of A to R bus bypass (40) |
| 73 | MAREN | Load MAR (31) |
| 74 | SROE | Shift register output enable (34) |
| 76 | CLRPTRE | Clear pointer error (42) |
| 77-79 | ABUS | Select for output on A-bus (33,50,32) |
| 80 | MODE08 | 8 bit mode control (34,32) |
| 81 | MODE16 | 16 bit mode control (34,32) |
| 82 | MODE32 | 32 bit mode control (32,34) |
| 83-87 | PROCSEL0-4 | Processor function select (34) |
| 88-90 | SPARE | Spare bits |

-continued

| BIT NUMBER | NAME | DESCRIPTION |
|---|---|---|
| 91 | RADROVR | Reset return address overflow (42) |
| 92 | SPARE | Spare bit |
| 93 | BREGOE | B register output enable (33) |
| 94-95 | DREGSEL | Destination register select (see AREGSEL for options) (33) |
| 96 | AIRSCEN | A instruction register select clock enable (47) |
| 97-99 | TAGSEL | Tag select (A XOR B, A register, A XOR const, const)(33) |
| 99 | ATAGOE | A register tag output enable (33) |
| 100 | ALUOE | Output ALU result to R-bus register (34) |
| 101 | SETC | Set carry latch (34) |
| 102 | CLRC | Clear carry latch (34) |
| 103 | ENASTAT | Enable status latch (39) |

APPENDIX B: MICROSEQUENCER BRANCH CONDITIONS

The following is a list of condition bits that are accessable from the processor of this invention. When a selected condition is true (logic one), then a delayed branch will occur.

| NAME | SELECT | BRANCH CONDITION |
|---|---|---|
| Always | 0 | Always branch |
| Carry | 1 | Last saved carry |
| Overflow | 2 | Last saved overflow |
| Negative | 3 | Last status saved, value<0 |
| Equal- | 4 | Last status saved, value=0 |
| Interrupt0- | 5 | Interrupt line 0 |
| Interrupt1- | 6 | Interrupt line 1 |
| Interrupt2- | 7 | Interrupt line 2 |
| Run | 8 | Run from Host |
| INCTL0-5 | 9-14 | Application dependent control from Host |
| BUSERR- | 15 | Bus error (parity or page fault) detected |
| Interrupt3- | 16 | Interrupt line 3 |
| ICEMPTY- | 17 | Instruction cache empty |
| PARERR- | 18 | Memory data access parity error detected |
| MINUSE | 20 | Memory is in a wait cycle |
| UCRAOF- | 21 | Microsequencer overflow |
| PTROF- | 22 | Pointer overflow |
| TAGZERO- | 23 | Tag=0 |
| RBUS00-39 | 24-63 | Selection of a bit from the processing output (LSB to MSB) |

The above description presents the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. A processor (10) operable with a plurality of different processor languages (such as Lisp, Prolog, etc.) by macroinstructions delivered from a main memory (28), each macroinstruction being executed by a microinstruction sequence of process steps, the improvement comprising:
- a plurality of individual and distinct microinstruction sequences associated with and arranged to selectively execute a single macroinstruction stored in an addressable storage memory (25), each of said individual microinstruction sequences being arranged to implement a different interpretation of said macroinstruction (such as a separate sequence for Lisp, a separate sequence for Prolog etc., irrespective of the particular processor language then in use);
- a macroinstruction decoder (15) setable to one of a plurality of distinct modes, each mode being individually associated with a different interpretation of the macroinstruction (such as a Lisp mode or a prolog mode) for decoding the macroinstruction into a selected microinstruction sequence;
- a mode selector (mode latch 38) connected to the macroinstruction decoder for setting the decoder in a selected mode; and
- means responsive to the decoder for executing the macroinstruction through the selected microinstruction sequence of steps.

2. A processor in accordance with claim 1 wherein the addressable storage memory includes a plurality of individual storage cells having unique addresses associated with each macroinstruction and means (42) responsive to the decoder for selecting the unique address in the addressable storage memory in which the microinstruction sequence for implementing the selected interpretation of the macroinstruction is stored.

3. A processor in accordance with claim 2 further having an arithmetic unit for processing multi-bit data words which are designated as such by a data word tag and descriptor, said processor further comprising:
- a data cache in the form of a plurality of registers;
- data storage busses connected to said data cache and said main memory for transferring specified data from said main memory to said plurality of registers;
- means connecting said arithmetic unit to receive and execute data on said busses and/or said plurality of registers; and
- means responsive to said arithmetic unit for accessing said instruction cache.

4. A processor in accordance with claim 3 further comprising:
- means for accessing registers sequentially from macroinstructions or from data words on said busses.

5. A processor operable with at least two different processor languages by macroinstructions delivered from a main memory, each macroinstruction being executed by a microinstruction sequence of process steps, the improvement comprising:
- a plurality of individual and distinct microinstruction sequences associated with and arranged to selectively execute a single macroinstruction, said microinstruction sequences being stored in an addressable memory separate from the main memory, at least two of said individual microinstruction sequences being arranged to execute said macroinstruction in a different processor language;
- macroinstruction decoding means setable to one of at least two distinct modes, each of said two modes being individually associated with a different processor language for decoding the macroinstruction into a selected microinstruction sequence associated with one of said language;
- mode selecting means coupled to the macroinstruction decoding means for setting the decoding means in a selected mode; and
- executing means responsive to the decoding means for executing the macroinstruction through the selected microinstruction sequence whereby the same macroinstruction can be processed with different processor languages.

6. An improvement in a macroinstruction processor including a macroinstruction decoder for selecting a microinstruction sequence for performing the current macroinstruction command and a main memory and storage register and wherein data words in the main memory and in the storage registers as a result of the processor language are both preceded and type-described by a large number of fixed-bit-length tags (with such tags typically describing fixed point data, floating point data, vectors, pointers, complex numbers, stack thread, consecutive cells, etc. illustrating some non-limiting examples) and wherein the processing of words of different data types requires a vectoring into different steps of a microinstruction sequence of process steps in order to locate the particular steps within the sequence that is adapted to process the different types of data the improvement comprising:
- a tag decoder (37) for simultaneously type decoding at least some of the bits that make up the data's tags to determine when data having different word types are to be processed in accordance with the macroinstruction; and
- a microsequencer responsive to the tag decoder for altering the microinstruction sequence to process the data in accordance with its word type.

* * * * *